United States Patent
Bertonis et al.

(10) Patent No.: US 7,840,989 B2
(45) Date of Patent: *Nov. 23, 2010

(54) APPARATUS AND METHOD FOR EXTENDING A CABLE MODEM DATA SERVICE OVER WIRELESS LINKS

(76) Inventors: James G. Bertonis, 763 Blossom Hill Rd., Los Gatos, CA (US) 95032; Tomany Szilagyi, 13605 E. Zyante Rd., Felton, CA (US) 95018

( * ) Notice: Subject to any disclaimer, the term of this patent is extended or adjusted under 35 U.S.C. 154(b) by 1053 days.

This patent is subject to a terminal disclaimer.

(21) Appl. No.: 11/154,105

(22) Filed: Jun. 15, 2005

(65) Prior Publication Data

US 2005/0235333 A1 Oct. 20, 2005

Related U.S. Application Data

(63) Continuation-in-part of application No. 10/463,483, filed on Jun. 16, 2003, now Pat. No. 7,596,798.

(60) Provisional application No. 60/645,480, filed on Jan. 18, 2005.

(51) Int. Cl.
 *H04N 7/173* (2006.01)
(52) U.S. Cl. ................... 725/118; 725/111; 725/123
(58) Field of Classification Search ............. 725/105, 725/111, 114–118, 121, 123, 126–129; 348/723; 455/91, 93; 370/466, 467, 477, 480
See application file for complete search history.

(56) References Cited

U.S. PATENT DOCUMENTS

| | | | |
|---|---|---|---|
| 5,748,619 A | 5/1998 | Meier | |
| 5,839,052 A | 11/1998 | Dean et al. | |
| 5,867,763 A | 2/1999 | Dean et al. | |
| 5,870,134 A | 2/1999 | Laubach et al. | |
| 5,987,303 A | 11/1999 | Dutta et al. | |
| 6,075,972 A | 6/2000 | Laubach et al. | |
| 6,259,910 B1 | 7/2001 | Fairfield et al. | |
| 6,324,379 B1 | 11/2001 | Hadden et al. | |
| 6,407,991 B1 | 6/2002 | Meier | |
| 6,415,150 B1 | 7/2002 | Owens et al. | |
| 7,505,531 B1 * | 3/2009 | Pasternak et al. | 375/298 |
| 2002/0103001 A1 * | 8/2002 | Weissman | 455/524 |
| 2003/0066088 A1 | 4/2003 | Jung | |
| 2003/0185163 A1 * | 10/2003 | Bertonis et al. | 370/315 |
| 2003/0190903 A1 * | 10/2003 | Melamed | 455/277.1 |

FOREIGN PATENT DOCUMENTS

| | | |
|---|---|---|
| EP | 0884915 | 12/1998 |
| GB | 2253770 | 9/1992 |
| GB | 2361145 | 10/2001 |

* cited by examiner

*Primary Examiner*—Ngoc Vu
(74) *Attorney, Agent, or Firm*—Connolly Bove Lodge & Hutz LLP

(57) ABSTRACT

An apparatus and method are presented to allow the extension of a data cable modem service, for example DOCSIS, over a wireless link. According to the invention a wireless hub transceiver is connected to a distribution coax cable of, for example, a DOCSIS based system. The downstream data is transferred over a wireless link to a remote subscriber radio frequency (RF) unit connected to a cable modem that provides the downstream data to the subscriber. Similarly, upstream data is sent from the subscriber cable modem over the wireless link to the wireless hub transceiver where such data is inserted back to the distribution coax cable.

27 Claims, 5 Drawing Sheets

APPARATUS AND METHOD FOR EXTENDING A CABLE MODEM DATA SERVICE OVER WIRELESS LINKS

CROSS REFERENCE TO RELATED APPLICATIONS

This application is a continuation-in-part of U.S. patent application Ser. No. 10/463,483 filed on Jun. 16, 2003, now U.S. Pat. No. 7,596,798 and further takes priority of U.S. provisional patent application No. 60/645,480 filed on Jan. 18, 2005.

BACKGROUND OF THE INVENTION

1. Field of the Invention

The invention relates generally to providing of downstream and upstream data connectivity. More specifically, the invention relates to an interface that allows the extension of a cable modem data service over wireless links.

2. Discussion of the Prior Art

The delivery of data using the cable television (CATV) system has become common in residential areas where CATV is commonly available. The data are delivered both downstream and upstream using available channels and/or frequencies. The end user can connect to such systems through a cable modem that is capable of delivering the downstream data respective of a specific user to that user, as well as sending upstream data sent from the user and that are intended to reach another node of the system.

Because providers of CATV expect to deliver additional services, such as data for Internet connectivity, there is an interest to serve as large as possible number of clients. However, it is not always possible to provide a direct connection to each location. For example, a shopping mall near a residential area is not commonly wired for the use of CATV because to do so is quite low. FIG. 1 is a diagram showing the distribution of CATV to a residential area. Clients use a cable modem to have access to downstream data and to transfer data upstream. If the CATV operator wants to provide a service to clients in the shopping mall, a distribution coax cable must be laid. This includes a significant cost.

Some cable modems are compliant with the Data Over Cable Service Interface Specifications (DOCSIS), which interface specifications for standard, interoperable, data-over-cable network products, the standard specifications of which are herein incorporated by this reference thereto. Internet Service Providers (ISPs) using Multipoint Microwave Distribution System (MMDS) may also be compatible with DOCSIS. However, current thereto MMDS networks are not entirely satisfactory. MMDS networks are characterized by the limited number of channels available in the low radio frequency (RF) bands. Only 200 MHz of spectrum (between 2.5 GHz and 2.7 GHz) is allocated for MMDS use. This constraint reduces the effective number of channels in a single MMDS system.

Moreover, the MMDS wireless cable uses 6 MHZ television channels for upstream and downstream transmission. These channels are relatively closely spaced in frequency. Because the channels are so closely spaced in frequency, a diplexer is required at each subscriber location to separate the upstream transmission path and the downstream receive path. Thus, the processing equipment required, including the diplexer, is relatively expensive and cumbersome. Also, the up to two 6 MHZ channels which may be allocated to the reverse direction are less than the full upstream capacity of DOCSIS. This is a significant bandwidth limitation. In addition, because the MMDS channels are licensed, the ISP must go to the expense of purchasing or leasing a license that could cost in the millions of dollars.

Fortunately, in 1997 the U.S. Federal Communications Commission (FCC) set aside 300 MHz of spectrum in the 5 GHz band for the U-NII service. Three bands are defined in this spectrum: 5.15 to 5.25 GHz (U-NII band 1) and 5.25 to 5.35 GHz (U-NII band 2), which are designated for wireless LAN and other shorter-range use; and 5.725 to 5.825 GHz (U-NII band 3) for wide-area networking that reaches a greater distance with higher power. The U-NII bands are designated for wideband, high-data-rate digital communications. They are also license-free i.e. no license is required to operate on the U-NII bands. A detailed description of a system overcome the above discussed limitations, and that exploits the license free bands is provided in U.S. patent application Ser. No. 10/282,533, titled System and Method for Wireless Cable Data Transmission, assigned to common assignee and which is hereby incorporated by reference for all that it contains.

Systems that is known for using a cable modem at 5.8 GHz, as well as other microwave frequency bands, are quite complex. The downstream may use a single down conversion in the customer premises equipment (CPE) prior to the cable modem, with a separate local oscillator and phase locked loop (PLL). The CPE upstream requires a dual conversion architecture with two additional local oscillators and PLLs. To employ the benefits of a block up conversion in the CPE upstream, additional filter stages are required. Alternatively an individual channel conversion is employed for the upstream, which then also requires PLL programming to adjust for the changing cable modem upstream output frequency. Furthermore, the prior art uses a high-pass/low-pass filter combination, with multiple circuit elements. This results in high complexity and fabrication difficulty when used in conjunction with a flat panel antenna.

It would therefore be advantageous to provide an apparatus and a method that allows a CATV operator to deliver a data service to areas that are in the proximity of the service area, but that are not currently reached by a distribution coax cable. It would be further advantageous if such a system would not require additional transmission licenses. It would be further advantageous if a proposed implementation overcomes the deficiencies of prior art solutions by using a single PLL.

SUMMARY OF THE INVENTION

An apparatus and method are discussed that allow the extension of a data-over-cable system, such as the DOCSIS cable modem service, over a wireless link. According to the invention a wireless hub transceiver is connected to a distribution coax cable of a data-over-cable system based system. The downstream data are transferred over a wireless link to a remote subscriber radio frequency (RF) unit connected to a cable modem that provides the downstream data to the subscriber. Similarly, upstream data are sent from the subscriber cable modem over the wireless link to the wireless hub transceiver where such data are inserted back to the distribution coax cable.

DETAILED DESCRIPTION OF A PREFERRED EMBODIMENT OF THE INVENTION

Figure 1:
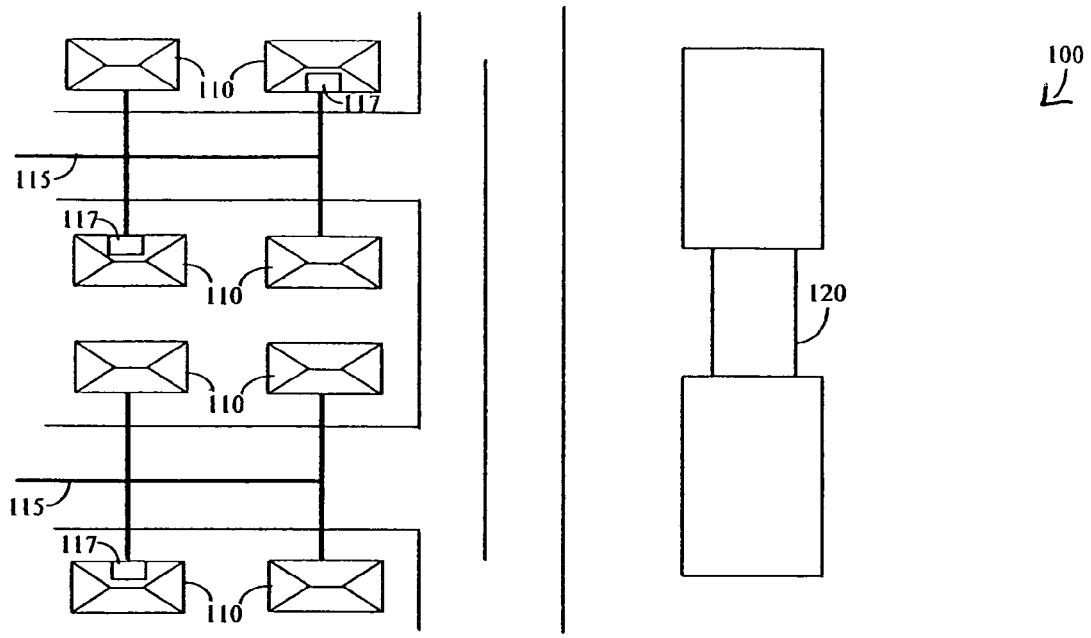
FIG. 1 is a schematic diagram showing distribution of CATV coax cables in a residential area (prior art)

Reference is now made to FIG. 1 in which a schematic diagram 100 showing the distribution of CATV over coax cable 115 to residences 110. Some of the residences 110 may be able to communicate data over the cable system 115 by connecting to a cable modem 117. Commonly, cable distribution is limited to the residential area itself. Commercial areas, such as a shopping mall 120 may be located several hundred or thousands of feet away from the end of the distribution area. With the advance of the delivery of data using cable modems, it may be desirable for the cable provider to provide such data delivery to mall 120. However, the investment in laying physical coax cable for distribution purposes may be prohibitive.

Figure 2:
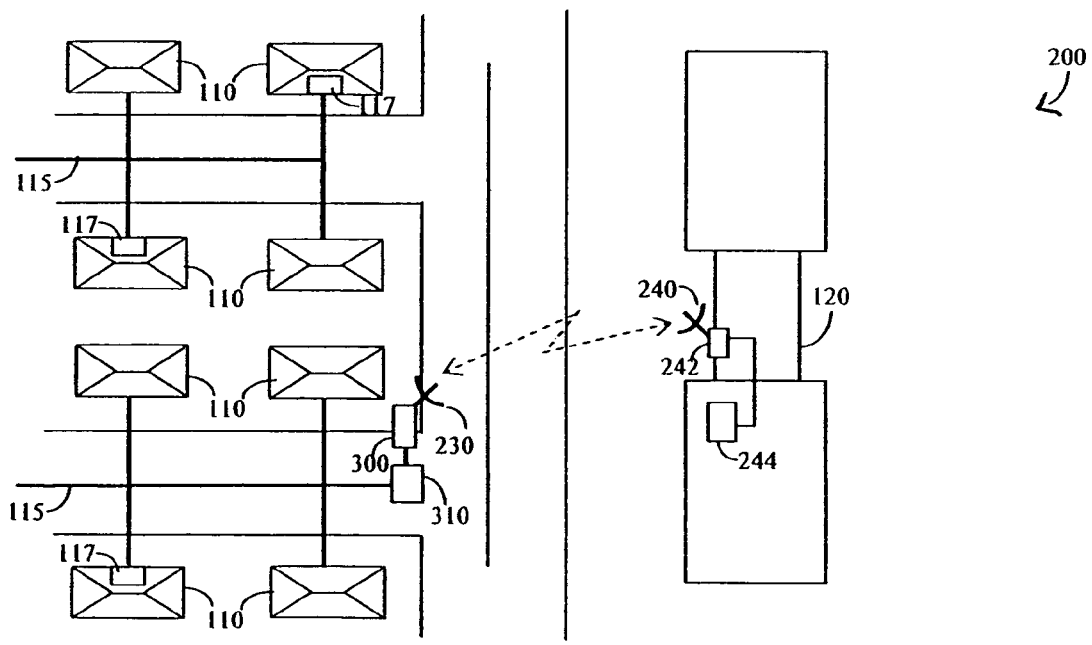
FIG. 2 is a schematic diagram showing distribution of CATV coax cables in a residential area with a wireless extension in accordance with the disclosed invention.

FIG. 2 shows a modified CATV distribution scheme using wireless communication to deliver data to shopping mall 120. For that effect, a splitter unit (SU) 310 is connected to the distribution coax cable 115. The SU 310 delivers downstream data to a wireless hub transceiver (WHT) 300 and the WHT 300 provides the SU 310 with upstream data. The WHT 300 uses an antenna 230 to communicate with another antenna 240, as explained in more detail below. A receiving unit comprised of an antenna 240 and a subscriber radio frequency unit (SRFU) 242, is described in detail in U.S. Pat. No. 6,785,150, titled System and Method for Wireless Cable Data Transmission, assigned to common assignee and which is hereby incorporated by reference for all that it contains. The SRFU 242 is also connected to a cable modem therefore enabling a subscriber in mall 120 to receive data communication through data-over-cable communication, for example through the extension of the DOCSIS cable modem service over a wireless link. However, the invention can be easily adapted to comply with other data over cable standards. Hereinafter, reference is made to DOCSIS. However, this should not be understood as limiting the scope of the invention. A more detailed description of an exemplary SRFU 242 is provided below. A person skilled in the art may easily modify such a receiving unit to support a 64 or 256 quadrature amplitude modulation (QAM). The SU 310 provides upstream and downstream connectivity to the WHT 300. In one embodiment, the SU 310 also provides the AC power required for the operation of the WHT 300. A more detailed description of the WHT 300 is provided below.

Figure 3:
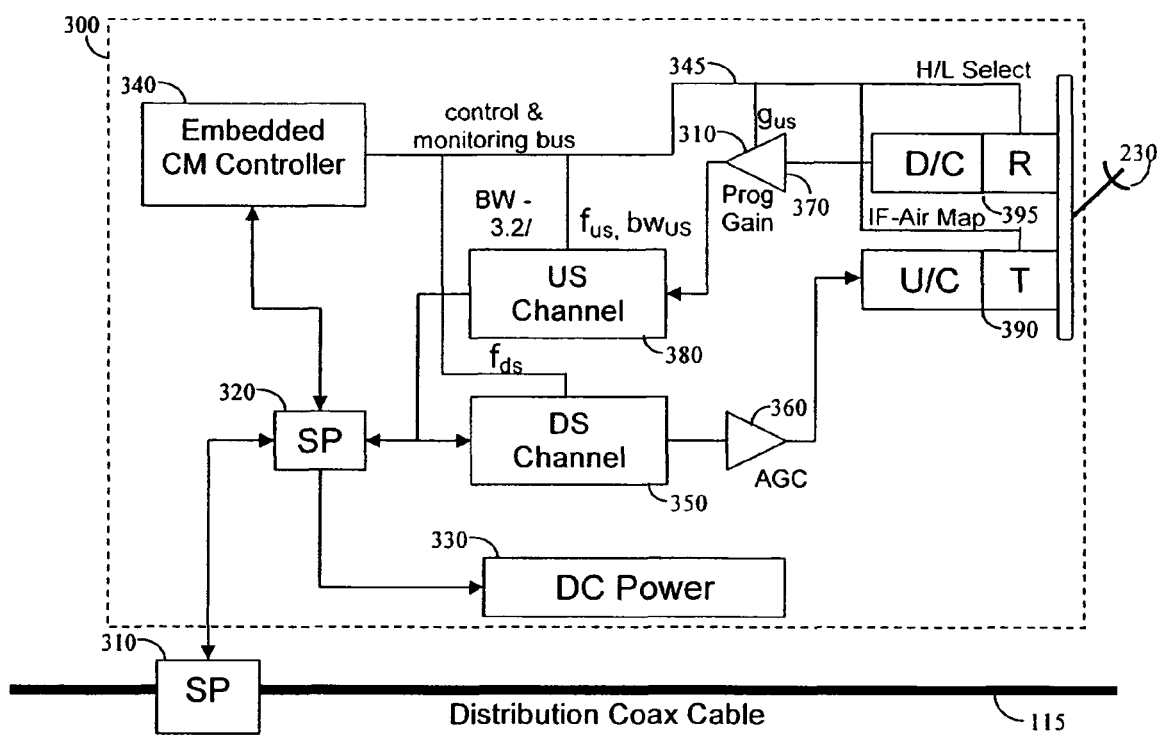
FIG. 3 is a schematic block diagram showing an architecture an exemplary wireless cable extension hub (cable side) connected to a distribution coax cable of a CATV.

FIG. 3 shows an exemplary and non-limiting architecture of a wireless cable extension hub (cable side) implemented in accordance with the disclosed invention and, in particular, shows a detailed block diagram of a WHT 300 connected through a SU 310 to a distribution coax cable 115. The WHT 300 comprises a splitter 320, an embedded cable modem controller 340, a downstream channel unit 350, an automatic gain control 360, a programmable gain 310, an upstream channel unit 380, an up-converter transmitter unit 390, and a down-converter receiver unit 395, both of which are connected to an antenna 230. A DC power unit 330 is optionally connected to a splitter 320 if it is possible to provide AC power from the distribution coax cable 115.

Figure 8:
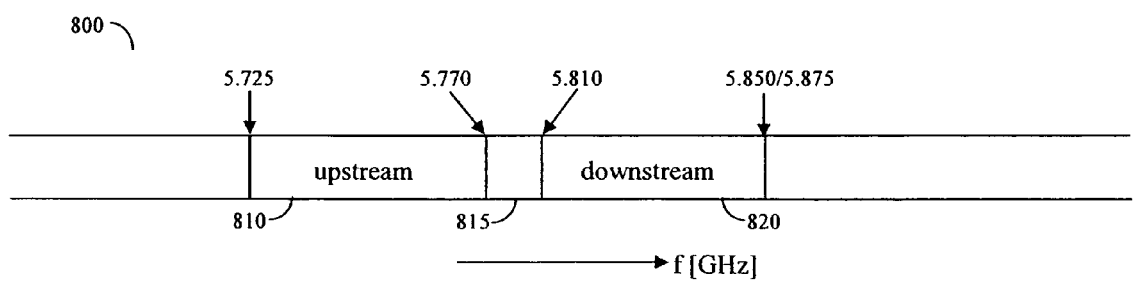
FIG. 8—is a frequency map showing upstream and downstream frequencies in accordance with the disclosed invention.

FIG. 8 also shows frequency bands that are used for the purpose of transmitting the upstream and downstream data. Specifically, in accordance with the disclosed invention, upstream data are transmitted in a frequency band 810 between 5.725 GHz and 5.770 GHz. The downstream data are transmitted over a frequency band 820 between 5.810 GHz and 5.850 GHz. In some cases, for example in international frequency allocations, the upper frequency is 5.875 GHz. There is also a band of frequencies 815, between 5.770 GHz and 5.810 GHz, that is used as a guard, or dead, zone. This is used to ensure separation between the upstream and downstream transmissions over the air. It should be noted, however, that DOCSIS is only one example of a data-over-cable transmission standard, though reference hereinafter is made to DOCSIS.

The splitter 320 is responsible for handling the signal communication with the SU 310, operating in conjunction with the embedded cable modem controller 340, as well as delivering to and receiving from downstream and upstream signals for the downstream channel unit 350 and upstream channel unit 380, respectively. Optionally, if the distribution coax cable 115 is capable of delivering AC power to, WHT 300, the splitter 320 is also responsible for delivering AC power to the DC power unit 330 that provides the DC power required by the WHT 300 for its operation.

Operation of the WHT 300 is performed under the control of the embedded cable modem controller 340. Various control signals are delivered to components of WHT 300. The downstream channel unit 350 is controlled as to the center DOCSIS downstream frequency ($f_{ds}$) for wireless operation. A bandwidth of 6 MHz is used which is the standard bandwidth used in CATV systems. The upstream channel unit is controlled for both the center DOCSIS upstream frequency ($f_{us}$) for wireless operation, as well as for the upstream DOCSIS bandwidth ($bw_{us}$) which is selective at doubling steps starting from 200 KHz up to 3.2 MHZ, or 6.4 MHz in the case of DOCSIS 2.0. DOCSIS carriers support frequencies of 50-860 MHz for downstream communication, of which 75-120 MHz are used in accordance with the disclosed invention; and 5-48 MHz for upstream communication, of which 5-42 MHz are used in accordance with the disclosed invention. The embedded cable modem controller 340 also controls the down-converter 395 as to the selection of the upstream carrier frequencies in the range of 5.725 to 5.770 GHz. These frequencies are selected such that they are in the license frequency spectrum. The controller 340 also controls the up-converter 390 as for the operation of the cable frequency air map, i.e. the conversion necessary from the cable frequency to the air frequency for the wireless downstream transmission. These frequencies are selected such that they are in the license free frequency spectrum. Hence, the embedded cable modem controller 340 determines the DOCSIS carrier frequency mapping from cable to air.

An automatic gain control (AGC) 360 connected between downstream channel unit 350 and the up-converter transmitter unit 390 ensures that the correct level of gain is used. This is particularly important because as the CATV signal received through distribution coax cable 115 may vary considerably throughout its distribution area. However, for the purpose of quality transmission it is essential to maintain required levels of signal. Similarly, a programmable gain unit 370 is connected between the down-converter receiver unit 395 and this upstream channel unit 380. The gain is controlled by an embedded cable modem controller 395 that provides the upstream gain ($g_{us}$) parameter. The value for g can be determined at installation or, in another embodiment, it can be adjusted from time-to-time automatically through test sequences initiated by embedded cable modem controller 395. The DOCSIS standard requires that all cable modems adjust their upstream power level in a long AGC loop commanded from the cable modem termination system (CMTS) equipment. The range of adjustment is approximately 50 dB to account for large variations in the cable plant upstream system gain and level. The invention uses the setting of the embedded CM controller upstream level to adjust the gain of the path $g_{us}$ for the wireless subscriber unit. By removing the cable plant level variation in the wireless return path, the subscriber cable modem gain variation is available to compensate for air link radio frequency (RF) level variations. The CMTS in the headend commands the subscriber modem level in the same manner as got wired modems, but the actual gain compensation is for both the wired modem and the wireless link.

The embedded CM controller 340 periodically computes the correct setting of $g_{us}$ such that the upstream signal level from each of subscriber modems 244, as commanded by the CMTS during its normal long AGC loop operation, remains within the optimum operating range of the subscriber modem, and is presented at the nominal level for entry into the cable system upstream path at the WHT 300 splitter 320. This computation and correction to $g_{us}$ normally takes place less frequently than the normal CMTS/subscriber modem long AGC loop correction. In yet another embodiment, the CM controller 340 monitors as described above, and then adjusts $g_{us}$ for each transmission for each subscriber modem 244 in very small steps so the CMTS can command subscriber modem 244 to make normal gain changes without being aware that $g_{us}$ is also being adjusted.

Figure 4:
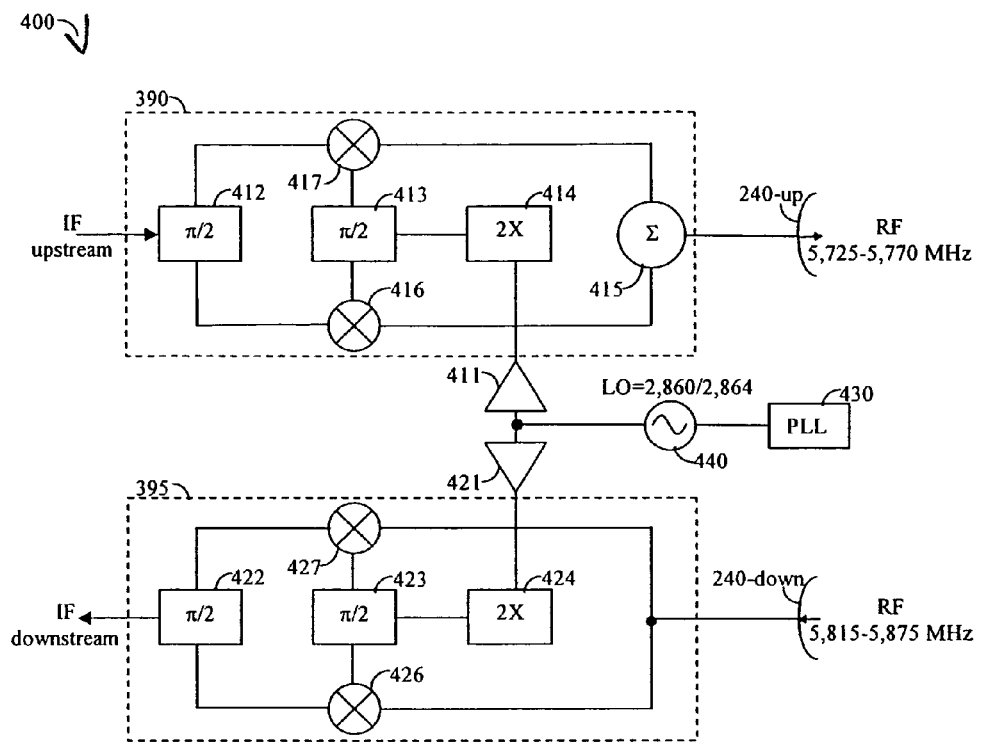
FIG. 4 is a schematic block diagram showing an exemplary 5.7/5.8 GHz Split-Band CPE architecture in accordance with the disclosed invention.

FIG. 4 shows a 5.7/5.8 GHz Split-Band CPE architecture implemented in accordance with the disclosed invention. The up-converter 390 is connected to the upstream portion of an antenna 240, i.e. antenna 240-up, that is capable of transmitting wireless signals at a frequency range of 5.725 to 5.770 GHz. The down-converter 395 is connected to the downstream portion of antenna 240, i.e. antenna 240-down, capable of receiving wireless signals at a frequency range of 5.810 to 5.875 GHz. As noted above in conjunction with FIG. 8, there is a guard frequency area between 5.770 and 5.810 GHz. A single PLL 430 is used to drive a local oscillator (LO) 440 that in turn, drives both the upstream and downstream converters 390 and 395 respectively. The LO 440 generates a signal at a frequency of 2.86 GHz which is delivered to the buffers 411 and 421, each of which drives its respective converter. The LO frequency is doubled using the frequency doublers 414 and 424. The phase shifters 412, 413, 422, and 423, maintain a phase shift of ninety degrees between the two paths of the signal. The harmonic mixers 416 and 417 are used to mix the signal and the doubled LO frequency in the upstream path, and the harmonic mixers 426 and 427 perform the function for the downstream path. A summation unit 415 sums up the signals from the two internal paths which are phase shifted in the upstream path. In the downstream path, the signal received from antenna 240-down is split between the two paths of the down converter 395. The frequency is actually synthesized and fed to the LO port of the harmonic mixers at one-half the frequency (2.860 GHz), which allows the 5.720 GHz, to be rejected from the upstream output path, and therefore removed from the signal transmitted on the upstream. While not required, this allows the use of the same LO 440 and PLL 430 for the downstream receiver block 395. The cable modem upstream provides frequencies in the range of 5-50 MHz (end points) that are mapped from 5.725 through 5.770 GHz in the stated frequency example. Likewise, downstream transmissions at 6 MHz channels, beginning at 5.810, GHz are converted to cable modem downstream input channels, beginning at 75 MHz. These values are provided for exemplary purposes only, and should not be considered as limiting the scope of the disclosed invention. Specifically, Euro-DOCSIS 8 MHz channels could also be accommodated using the principles disclosed herein. The antenna 240 is preferably a puck-style bandstop filter that is capable of separating the 5.7 GHz and 5.8 GHz upstream and downstream signals at the CPE antenna 240. This reduces the number of components required to two microwave pucks, which are adhered under a shield and tuned directly onto a CPE flat panel printed circuit board (PCB) antenna array.

Figure 5:
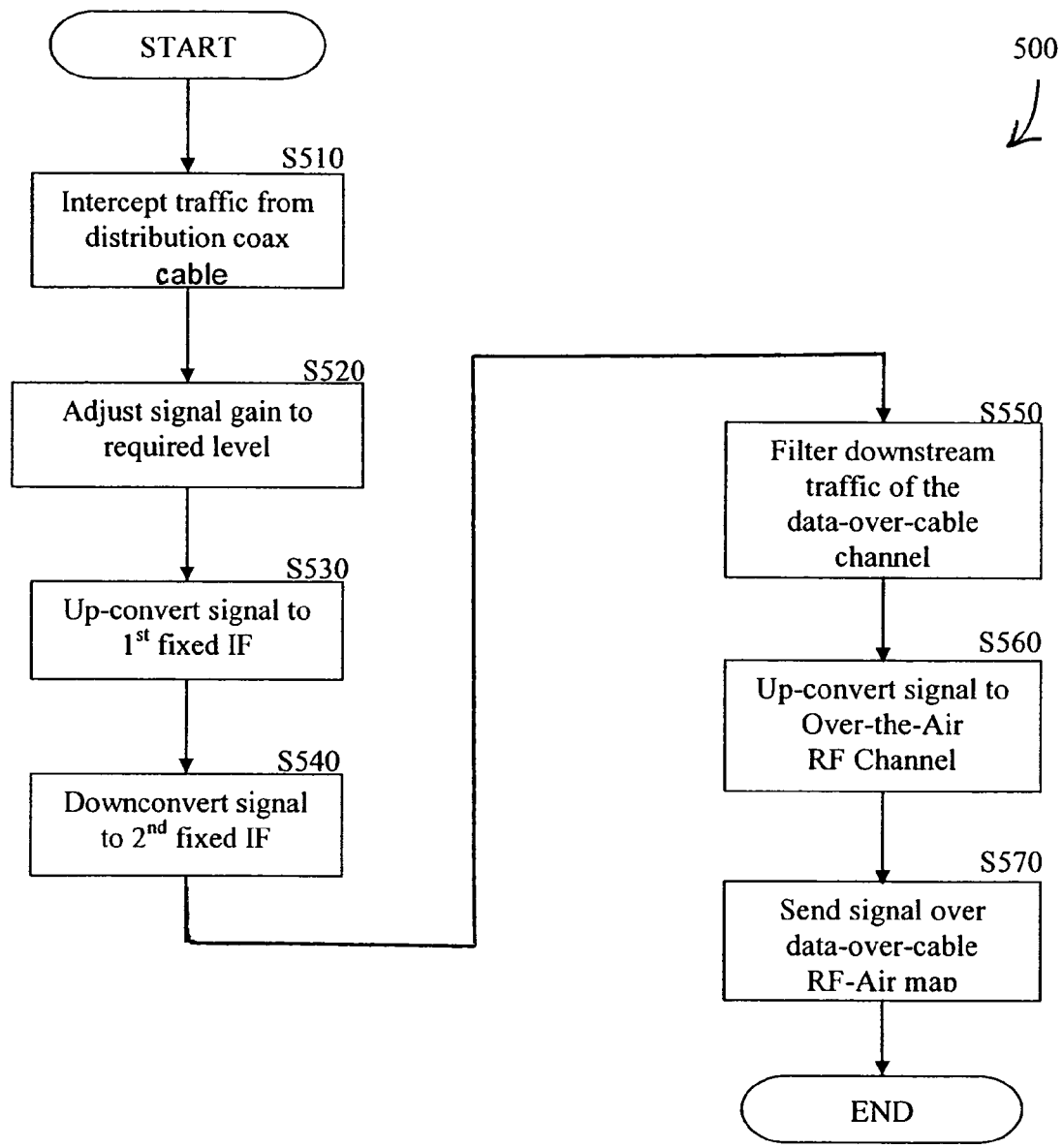
FIG. 5 is a flowchart showing the downstream flow of data in accordance with the disclosed invention.

FIG. 5 is an exemplary flowchart 500 for showing the sending of data for downstream transmission in a CATV data distribution system having a wireless point of termination. In step S510, traffic is intercepted from a CATV distribution coax cable. In step S520, the signal received in step S510 is amplified as may be required, preferably by using an AGC arrangement. The selected DOCSIS downstream channel, typically over a 90-1000 MHz range, employed by the specific CATV provider, is upconverted to a fixed IF frequency, for example 1220 MHz (step S530), then downconverted to a fixed IF frequency, typically 44 MHz (step S540), where the signal is sent to a DOCSIS channel filter (step S550). In step S560, the DOCSIS cable frequency is upconverted to a RF frequency channel, and in step S570 it is sent via DOCSIS over the air. These frequencies are selected such that they are in the license free frequency spectrum in the range of 5.725 to 5.875 GHz, or a subset thereof such as 5.810 to 5.875 GHz. The embedded cable modem controller 340 determines the DOCSIS carrier frequency of the original signal from the cable and automatically tunes the frequency synthesizer for the first conversion steps. The disclosed sequence of steps is repeated every time the selected DOCSIS downstream frequency changes because the embedded cable modem automatically tracks this change, and the new tuning information is thereby sent. In one embodiment, the air map ensures that the CM receives its downstream signal aligned with a standard CATV channel plan, e.g. the North American CATV plan. It such an embodiment it is required to maintain the air map at integer multiples of 6 MHz to adhere with the standard channel spacing. Hence, a conversion is performed from any DOCSIS channel from 90-1,000 MHz to any, for example, 5.8 GHz channel. In another embodiment, air frequency mapping may be used. An alternative DOCSIS channel mapping, such as the 8 MHz system used by Euro-DOCSIS, could also be employed in a similar manner as such outlined. The total number of channels available would be equal to the total RF frequency bandwidth available, divided by the channel bandwidth.

Figure 6:
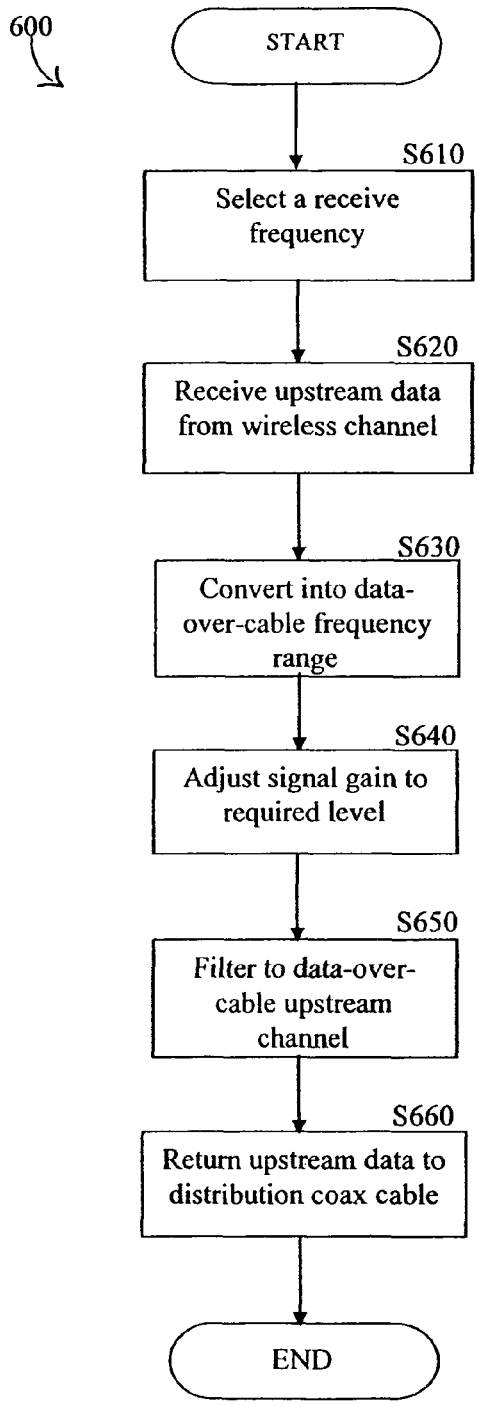
FIG. 6 is a flowchart showing the upstream flow of data in accordance with the disclosed invention.

FIG. 6 is a 600 showing the receiving of data for upstream transmission in a CATV data distribution system having a wireless point of termination. Initially, in step S610, a return frequency is selected in the range of 5.725 GHz to 5.770 GHz. In step S620, upstream data are received from the wireless channel. The signal is down converted to the DOSIS cable frequency in step S630, specifically in the DOCSIS range of 5 to 50 MHz. The gain of the received signal is then adjusted in step S640. The specific gain $g_{us}$ can be programmed when the system is put in place in accordance with the specific transmit level characteristics of the embedded CM controller. The DOCSIS standard requires that all cable modems adjust their upstream power level in a long AGC loop commanded from the cable modem termination system (CMTS) equipment. The range of adjustment is approximately 50 dB to account for large variations in the cable plant gain. The invention uses the setting of the embedded CM controller upstream level to adjust the gain of the path $g_{us}$ for the wireless subscriber unit. By removing the cable plant level variation in the wireless return path, the subscriber cable modem gain variation is available to compensate for air link RF level variations. The CMTS in the headend commands the subscriber modem level in the same manner as for wired modems, but the actual gain compensation is for the wireless link. In step S650, the received signal is filtered for the specific DOCSIS channel used for upstream data delivery. In step S660, the upstream data are injected back to the CATV distribution cable. The disclosed sequence of steps is repeated every time data are transferred upstream to the CATV distribution coax cable 115 using the WHT 300. Step S630 and step S640 could alternately be performed in reverse order, as long as both steps are performed.

Figure 7:
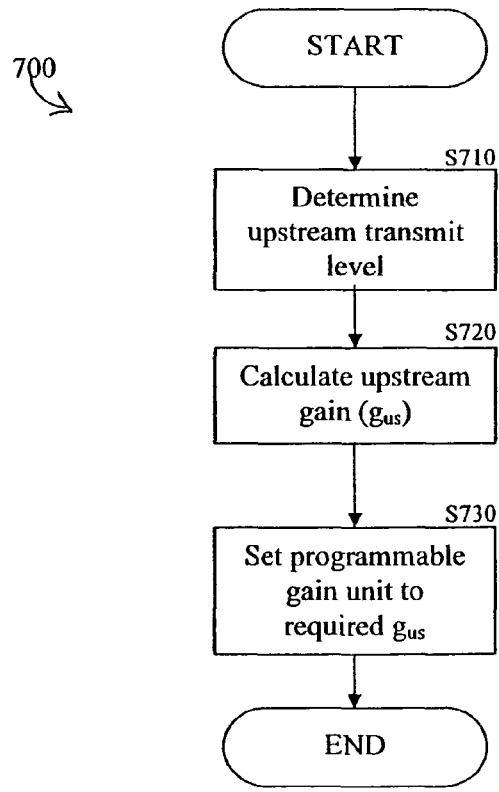
FIG. 7 is a flowchart showing the determination of the upstream gain ($g_{us}$)

FIG. 7 is a flowchart 700 showing the determination of the upstream gain ($g_{us}$). At step S710, a normal DOCSIS cable modem signal acquisition for communications between it and the cable headend CMTS equipment is performed. This procedure is part of the normal process, whereby the upstream transmit gain is adjusted over a range of approximately 50 dB to deliver a fixed level of signal to the headend CMTS. This compensates for cable plant gain variations. In the step S720, the setting for the required upstream gain ($g_{us}$) is determined as a linear relationship to the embedded CM controller's 340 transmit level. In step S730, the $g_{us}$ determined in step S720 is applied to PGU 370.

This sequence of steps allows for the removal of gain variability of the upstream cable plant for signals received from the WHT 300. With the cable plant level variation removed, the subscriber modem 244 level adjustment range automatically compensates the air RF link level variations using the normal DOCSIS method.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. An apparatus for providing a cable television (CATV) upstream and downstream data service with wireless connectivity, comprising:
    a splitter;
    an embedded cable modem controller connected to said splitter, the embedded cable modem controller being configured to determine a DOCSIS carrier frequency mapping from cable to air;
    a downstream channel unit connected to said splitter and also connected to an automatic gain control (AGC) module;
    an upstream channel unit connected to said splitter and further connected to a programmable gain unit (PGU); and
    an up-converter and a down converter each having an antenna connection, said up-converter connected to said AGC and said down-converter connected to said PGU, wherein said down-converter and said up converter are connected to a single local oscillator, said single local oscillator connected to a phase locked loop (PLL).

2. The apparatus of claim 1, wherein said single local oscillator is operable at an oscillation frequency that is half a desired band frequency.

3. The apparatus of claim 2, wherein said oscillation frequency is 2.86 GHz.

4. The apparatus of claim 1, further configured to use a first wireless frequency range for upstream transmission, a second wireless frequency range for a downstream transmission, and a frequency gap between said first wireless frequency range and said second wireless frequency range.

5. The apparatus of claim 4, wherein said wireless upstream frequency range is within a range of 5.810 GHz to 5.875 GHz.

6. The apparatus of claim 4, wherein said wireless downstream frequency is within the range of 5.725 GHz to 5.770 GHz.

7. The apparatus of claim 4, wherein a frequency guard range is within a range of 5.770 GHz to 5.810 GHz.

8. The apparatus of claim 4, wherein said transmission band comprises license free frequency band.

9. The apparatus of claim 1, wherein said cable television (CATV) upstream and downstream data service conforms with a over cable service interface specification (DOCSIS).

10. The apparatus of claim 1, further comprising:
    an antenna comprised of a puck-style bandstop filter for separating said upstream and downstream signals.

11. The apparatus of claim 1, wherein said upstream channel unit is configured to:
    upconvert a data signal of said data service to a first intermediate frequency (IF); and
    downconvert said first IF to a second IF.

12. The apparatus of claim 11, wherein said first IF is approximately 1220 MHz.

13. The apparatus of claim 11, wherein said second IF is approximately 44 MHz.

14. An apparatus for adding upstream and downstream wireless data transmission to a data service provided on a cable television (CATV) network, comprising:
    a splitter unit (SU) connected to a distribution coax cable of said CATV; and
    a wireless hub transceiver (WHT) connected to said SU, said WHT comprising an up-converter, a down-converter and an embedded cable modem controller being configured to determine a DOCSIS carrier frequency mapping from cable to air,
    wherein said down-converter and said up-converter are each connected to a single local oscillator, said single local oscillator connected to a phase locked loop (PLL).

15. The apparatus of claim 14, further comprising:
    an antenna connected to said WHT for wireless transmission of downstream data to at least one subscriber radio frequency unit (SRFU) and reception of upstream data from said at least one SRFU.

16. The apparatus of claim 14, wherein said single local oscillator is operable at an oscillation frequency that is half a desired band frequency.

17. The apparatus of claim 16, wherein said oscillation frequency is approximately 2.86 GHz.

18. The apparatus of claim 14, configured to use:
    a first wireless frequency range for upstream transmission, a second wireless frequency range for a downstream transmission, and a guard frequency gap between said first wireless frequency range and said second wireless frequency range.

19. The apparatus of claim 18, wherein said wireless upstream frequency range is within a range of 5.725 GHz to 5.770 GHz.

20. The apparatus of claim 18, wherein said wireless downstream frequency range within a range of 5.810 GHz to 5.875 GHz.

21. The apparatus of claim 18, wherein said frequency guard range within a range of 5.770 GHz and 5.810 GHz.

22. The apparatus of claim 18, wherein said transmission band comprises a license free frequency band.

23. The apparatus of claim 15, wherein said antenna comprises a puck-style bandstop filter for separating said upstream and downstream signals.

24. The apparatus of claim 14, wherein said cable television (CATV) upstream and downstream data service conforms with an over cable service interface specification (DOCSIS).

25. The apparatus of claim 14, wherein said WHT is configured to:
upconvert a data signal of said data service to a first intermediate frequency (IF); and
downconvert said first IF to a second IF.

26. The apparatus of claim 25, wherein said first IF is approximately 1220 MHz.

27. The apparatus of claim 25, wherein said second IF is approximately 44 MHz.

* * * * *